United States Patent [19]

Jane

[11] Patent Number: 4,616,612
[45] Date of Patent: Oct. 14, 1986

[54] INTERNAL COMBUSTION ENGINE PISTON
[75] Inventor: Phillip A. Jane, Peterborough, England
[73] Assignee: Perkins Engines Group Limited, London, England
[21] Appl. No.: 700,579
[22] PCT Filed: Jun. 25, 1984
[86] PCT No.: PCT/GB84/00224
§ 371 Date: Feb. 11, 1985
§ 102(e) Date: Feb. 11, 1985
[87] PCT Pub. No.: WO85/00198
PCT Pub. Date: Jan. 17, 1985
[30] Foreign Application Priority Data
Jun. 28, 1983 [GB] United Kingdom ............... 8317453
[51] Int. Cl.$^4$ ........................................... F02B 19/08
[52] U.S. Cl. ........................................ 123/276; 123/279
[58] Field of Search ................................. 123/276, 279
[56] References Cited

U.S. PATENT DOCUMENTS 3,374,773 3/1968 Scherenberg .
4,176,628 12/1979 Kanai et al. .
4,538,566 9/1985 Tsuruoka ........................ 123/276

FOREIGN PATENT DOCUMENTS 2407783 9/1974 Fed. Rep. of Germany .
3004580 8/1981 Fed. Rep. of Germany .
509838 8/1939 United Kingdom .
1012924 12/1965 United Kingdom .

Primary Examiner—Tony M. Argenbright
Attorney, Agent, or Firm—Robert L. Farris

[57] ABSTRACT

In an internal combustion engine comprising a piston (1) having a combustion bowl (3) recessed in the crown of the piston and a plurality of arcuate recesses (7) formed in the side wall (6) of the bowl spaced apart by arcuate intermediate portions of the side wall, swirl means to cause the inlet air to rotate about the axis of the bowl, and fuel injection means (2) that serves to direct a plurality of fuel jets radially of the bowl each towards a corresponding recess (7), the piston is characterized in that the ratio of the maximum distance by which each recess (7) extends radially into the side wall (6) compared with the radius of the side wall (6), lies within the range 0.10 to 0.20.

6 Claims, 13 Drawing Figures

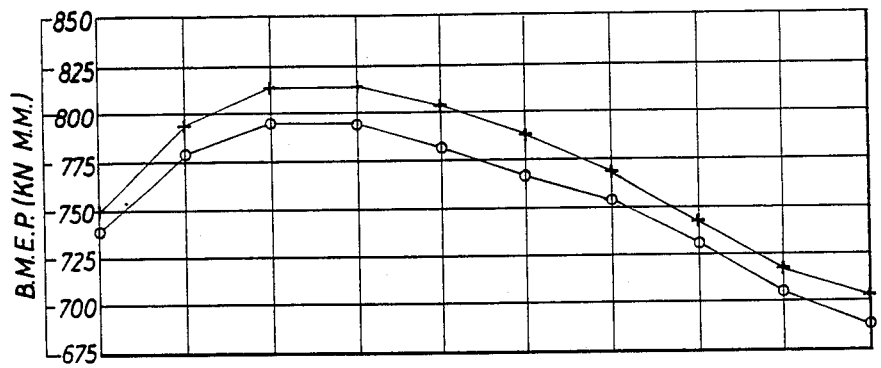
FIG.4
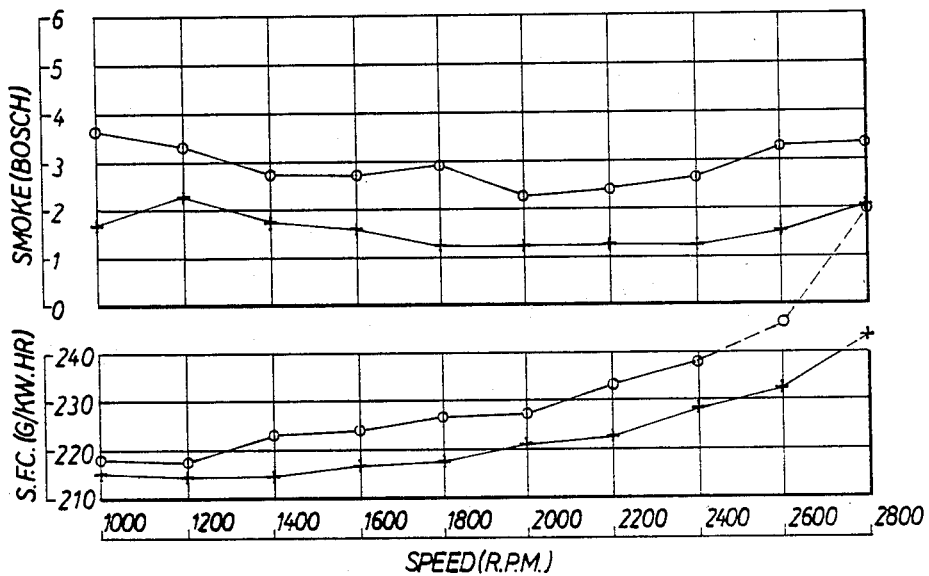

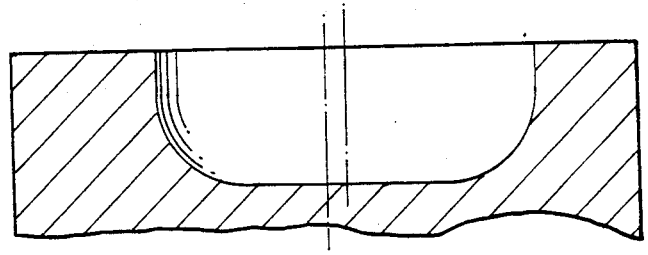
FIG.5
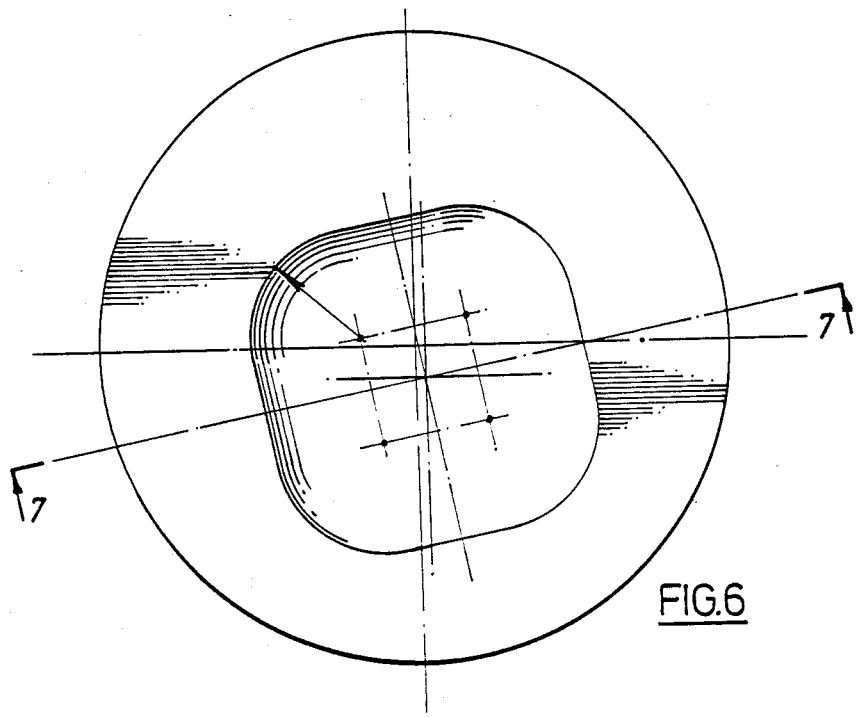
FIG.6
FIG.7
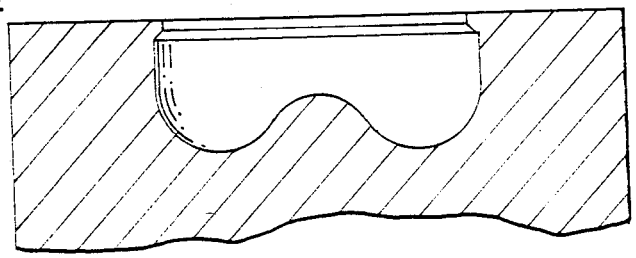

INTERNAL COMBUSTION ENGINE PISTON

TECHNICAL FIELD

This invention relates to a piston for an internal combustion engine having a combustion system of the direct injection type.

Diesel engines of the direct injection type are commonly provided with pistons having an open combustion bowl recessed in the crown, and means to produce a swirling motion of the inlet air about the axis of the bowl so as to give improved fuel/air mixing and combustion. It is also known to modify the shape of the combustion bowl in order to induce turbulence in the swirling flow of air and fuel in the bowl, thereby further increasing the rate of air/fuel mixing and hence improving the rate of heat release. This in turn allows the engine to be operated at more retarded fuel injection timings at which lower oxides of nitrogen emissions are produced, without suffering any serious effect of increased specific fuel consumption or smoke emission.

Bowl shapes have been modified by making them of a reentrant form with an over-hanging lip portion around the mouth of the bowl so as to produce a turbulent squish action beneath the lip of the bowl.

Also, the shape of the bowl in the plane normal to the bowl axis has been made non-circular by forming scallops in the side wall of the bowl or making the bowl of substantially square section. Turbulence is generated in the scallops or corners of the bowl, and fuel jets directed towards these regions are thereby more thoroughly mixed with the air.

U.S. Pat. No. 4,176,628 discloses a piston with a generally toroidal recessed bowl having four recesses in the side wall each to receive one of the four fuel jets. Each recess has a section that extends tangentially of the side wall and joins a semi-circular section, the tangential section lying on the upstream side of the air swirl in the chamber so as to lead air into the recess. The radius of the semi-circular section of the recesses is considered important in order that a large air swirl in the bowl shall induce a desired level of turbulence in the recesses. Preferably the ratio of the radii of the recesses and the bowl is between 1/6 and ½. In all the illustrated embodiments the actual depth of the recesses varies greatly and in all cases is relatively large.

U.K. No. 509,838 also discloses a piston with a toroidal recessed bowl having four recesses in the side wall each to receive one of the four fuel jets. Each recess is semi-circular and symmetrical about a bowl radius, and serves to accommodate a longer path length for a corresponding fuel spray directed into the recess. The size of the recesses is not considered important, but in all the illustrated embodiments the recesses are relatively deep in order to give a long fuel spray path length.

DISCLOSURE OF THE INVENTION

An object of the present invention is to provide a direct injection diesel engine with an improved combustion system that gives improved specific fuel consumption and smoke performance over a wide range of engine speeds.

According to the present invention, a piston for an internal combustion engine has a combustion bowl recessed in the crown of the piston and a plurality of arcuate recesses formed in the side wall of the bowl and spaced apart by arcuate intermediate portions of the side wall, and is characterised in that the ratio of the maximum distance by which each recess extends radially into the side wall compared with the radius of the side wall lies within the range 0.10 to 0.20.

In use swirl means causes the inlet air to rotate about the axis of the bowl, and fuel injection means serves to direct a plurality of fuel jets radially of the bowl each towards a corresponding recess. The recesses are sufficiently deep to produce the required turbulence for air/fuel mixing at all speeds but are not so deep as to have a detrimental affect on the swirling air motion at low engine speeds.

Preferably, the arcs of the recesses are formed on circles with centres lying on a circle coaxial with said intermediate arcuate portions of the side walls.

DESCRIPTION OF THE DRAWINGS

The invention will now be described by way of example with reference to the accompanying drawings in which

FIG. 4 shows the results of tests similar to those of FIG. 3 but with the fuel injection timing more retarded;

FIG. 5 is a plan view of a piston with a standard open bowl as used for comparison in obtaining the test results of FIGS. 3 and 4;

FIG. 6 is a plan view of a piston with a recessed bowl of substantially square section;

FIG. 7 is a section on the line 7—7 in FIG. 6;

BEST MODE OF CARRYING OUT THE INVENTION

Figure 1:
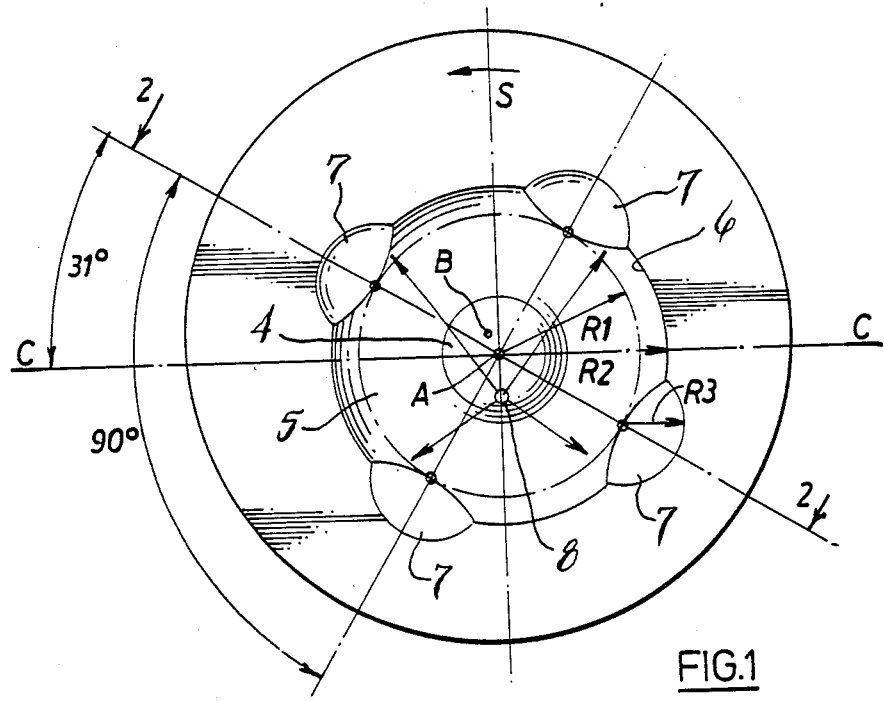
FIG. 1 is a plan view of a piston for an engine according to the invention.
Figure 2:
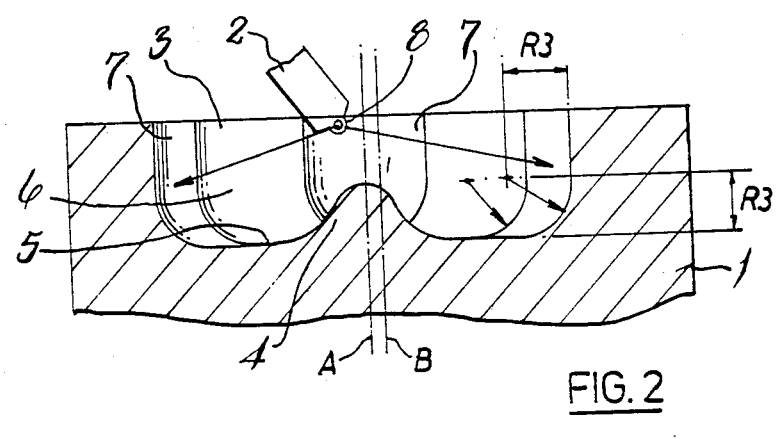
FIG. 2 is a section on the line 2—2 in FIG. 1.

FIGS. 1 and 2 show the crown of a piston 1 and a fuel injector 2 for use in a diesel engine according to the invention. The other components of the engine such as the cylinder block and cylinder head have not been illustrated because these can be standard components into which the piston and injector can be readily fitted by a person of ordinary skill in the art. It will be appreciated that the invention consists in the form of the combustion system comprising the bowl and fuel injection pattern and can be fully described by reference to these components alone.

A recessed combustion bowl 3 of generally toroidal shape is formed in the crown of the piston with the axis A of the bowl offset from the axis B of the piston. A raised projection or pip 4 of conical shape is formed centrally in the floor 5 of the bowl.

The side wall 6 of the bowl is cylindrical over its upper portion and blends into the floor 5 of the bowl on a radius R3. Four equi-angularly spaced recesses 7 are formed in the side wall, each having an arcuate section with centre C in the plane perpendicular to axis A (FIG. 1), and each extending the full height of the wall in the form of a channel (FIG. 2). The centres C for these arcuate recesses lie on a circle D (radius R1) within and coaxial with the side wall 6. The radius of these recesses in the cylindrical portion of the side wall is R3 and the recesses blend into the floor 5 of the bowl on the same radius R3, like the side wall 6.

The recesses 7 can be readily formed using a spherical cutter of radius R3 that is inserted axially into the bowl alongside the side wall in each of the four required angular positions, axial movement of the cutter being stopped once it touches the floor of the bowl. Sharp edges at the junction of the recesses 7, the side wall 6 and the floor 5 are then formed with blend radii.

The fuel injector 2 has a four hole nozzle 8 offset from the axes A and B that produce a spray pattern of four fuel jets lying on a cone over the pip 4. The included cone angle is 150 degrees. FIG. 2 shows the piston in the top dead centre position relative to the injector 2. The fuel jets are angularly spaced apart by 70 degrees, 90 degrees, 110 degrees, 90 degrees and are orientated so that each is directed towards a corresponding arcuate recess 7.

The engine incorporates known means to produce a swirl in the inlet air, this being indicated by the arrow S in FIG. 1, which shows the direction of swirl. The fuel jets are directed toward the upstream end of the arcuate recesses 7 as judged relative to the swirl S.

The performance of this combustion system has been investigated using standard tests carried out on a naturally aspirated four cylinder diesel engine with a compression ratio of 16:1. The engine incorporates a cylinder head with a directed inlet port that produces a high degree f swirl. The pistons are aligned along the centre line of the engine C—C as shown in FIG. 1.

Figure 3:
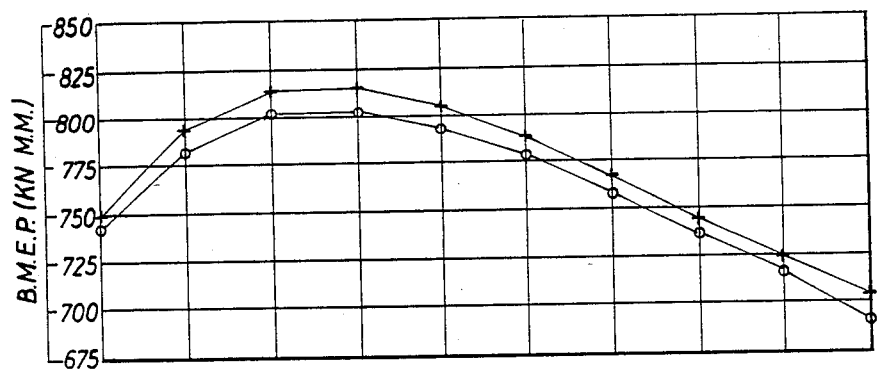
FIG. 3 shows specific fuel consumption (s.f.c.) and smoke emission test results for an engine with pistons according to FIG. 1 and an engine with the standard open bowl piston of FIG. 5.
Figure 3:
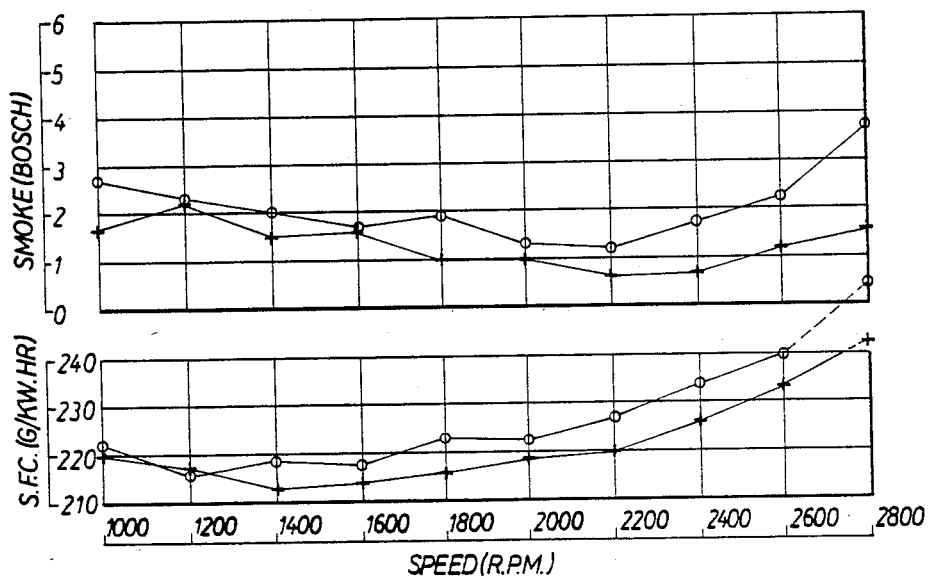

Full load, variable speed tests were conducted to measure specific fuel consumption (s.f.c.) and smoke emission at selected injection timings. The results for an injection timing of 18 degrees B.T.D.C. (Before Top Dead Centre) are shown in FIG. 3, and for a more retarded injection timing of 16 degrees B.T.D.C. are shown in FIG. 4. In each case, the results have been corrected to British Standard AU 141A conditions to allow for atmospheric temperature and pressure variations. For purposes of comparison, the same tests were carried out to measure specific fuel consumption and smoke using the standard open bowl for this four cylinder engine, shown in FIG. 5. The results in each case demonstrate that the bowl with recesses (results plotted by crosses) produced lower specific fuel consumption and smoke emissions than the standard open bowl (results plotted by circles), and that this effect is more pronounced at the more retarded injection timing of 16 degrees B.T.D.C. (FIG. 4). The specific fuel consumption and smoke emission performance of the bowl with recesses deteriorates slightly at the more retarded timing, but is still much better than the standard open bowl at advanced injection timing of 18 degrees B.T.D.C. The more retarded injection timing gives the associated advantages of lower oxides of nitrogen emissions and lower peak cylinder pressures.

Figure 8:
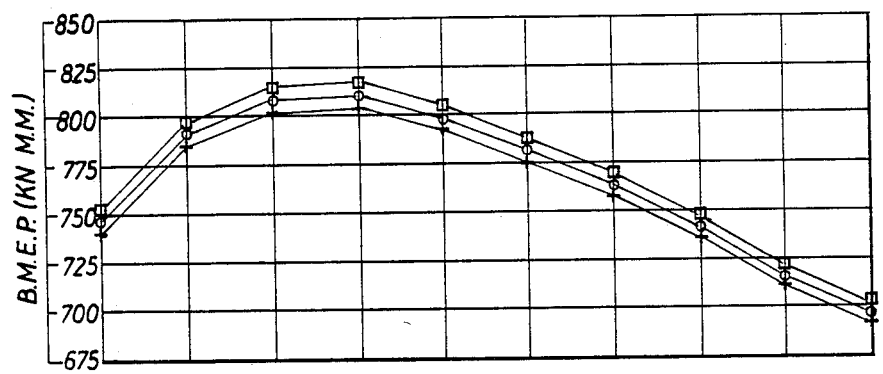
FIG. 8 shows s.f.c. and smoke emission test results for an engine with pistons according to FIG. 1, pistons according to FIG. 5, and pistons according to FIG. 6.
Figure 8:
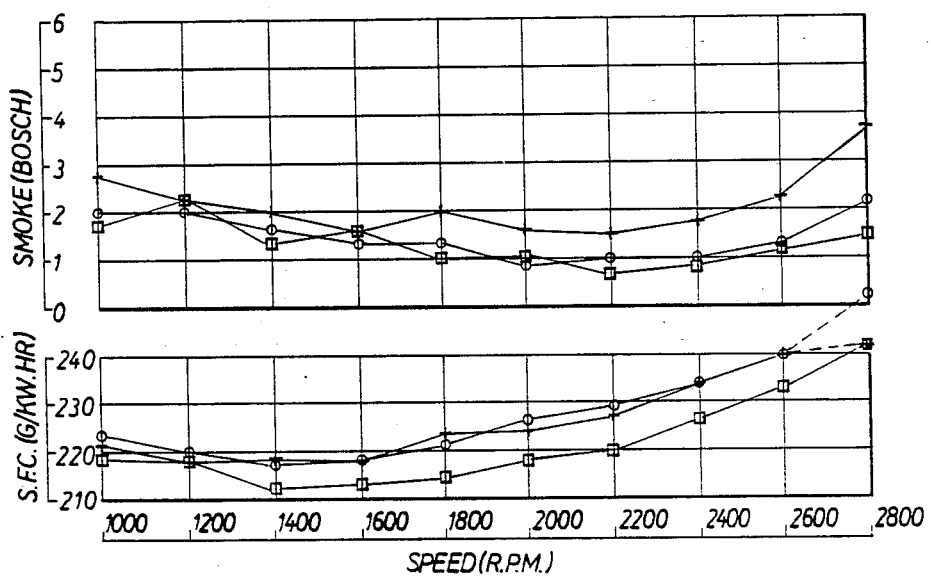

For purposes of further comparison, the same tests at the injection timing of 18 degree B.T.D.C. were carried out using a known recessed bowl of non-circular section, as shown in FIGS. 6 and 7. This known bowl has a generally square section with radiused corners as seen in the plane perpendicular to the bowl and piston axes A, B (FIG. 6). The results shown in FIG. 8 demonstrate that the bowl with recesses produces lower specific fuel consumption than both the standard open bowl and the square section bowl (results plotted with squares) and that the smoke emission of the bowl with recesses is lower than that of the square section bowl over at least the higher speed range. In order to investigate the effect of different size recesses in the bowl of FIG. 1 and 2, comparative engine tests for specific fuel consumption and smoke emission were conducted with a second and third set of pistons each with different bowl radii R1, R2 as shown below:

| BOWL | R1 (mm) | R2 (mm) | R3 (mm) | $\frac{R1 + R3 - R2}{R2}$ |
|---|---|---|---|---|
| 1st (FIGS. 1 and 2) | 22.9 | 27.6 | 10 | 0.19 |
| 2nd | 19.3 | 24.0 | 10 | 0.22 |
| 3rd (FIGS. 9 and 10) | 22.9 | 24.0 | 10 | 0.37 |

The bowl of the second set of pistons differs from that of FIGS. 1 and 2 in that both radii R1 and R2 are reduced. The depth of the bowl is increased to keep the volume of the bowl, and thus the compression ratio constant.

Figure 9:
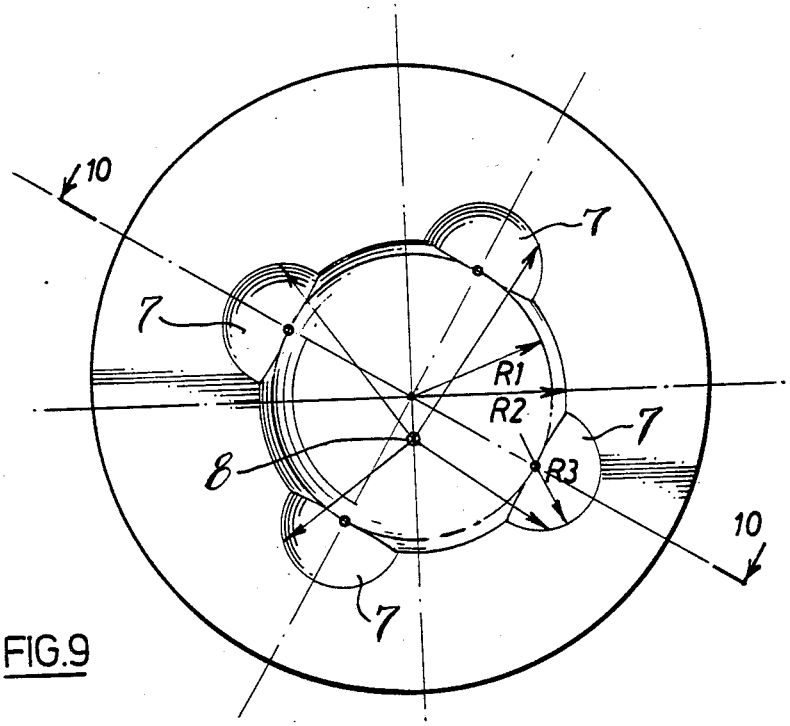
FIG. 9 is a plan view of a modified form of the piston of FIG. 1.
Figure 10:
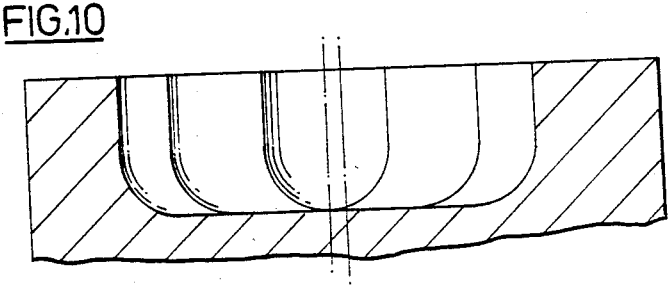
FIG. 10 is a section on the line 10—10 in FIG. 9.

The bowl of the third set of pistons is shown in FIG. 9 and 10 and differs from that of FIGS. 1 and 2 in that the radius R2 is reduced. The central pip 4 is omitted, and the volume of th bowl remains the same.

It will be appreciated that reducing the bowl wall radius R2 serves to make the recesses 7 larger, if R1 and R2 remain unchanged, and that the ratio of the radial depth of the recesses compared with the bowl radius (R1+R3−R2)/R2 is a measure of the prominence of the recesses. The recesses 7 of the bowl for the second and third set of pistons are made progressively more prominent, the difference being clear from a comparison of FIGS. 1 and 9.

Figure 11:
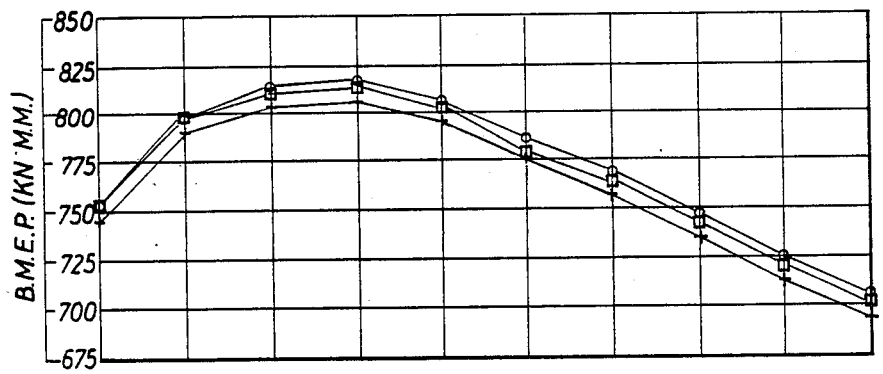
FIG. 11 shows s.f.c. and smoke emission test results at an injection timing of 18 degrees B.T.D.C. for an engine with pistons according to FIG. 1, an engine with modified pistons according to FIG. 9, and an engine with modified pistons similar to FIG. 1 but with R1 smaller.
Figure 11:
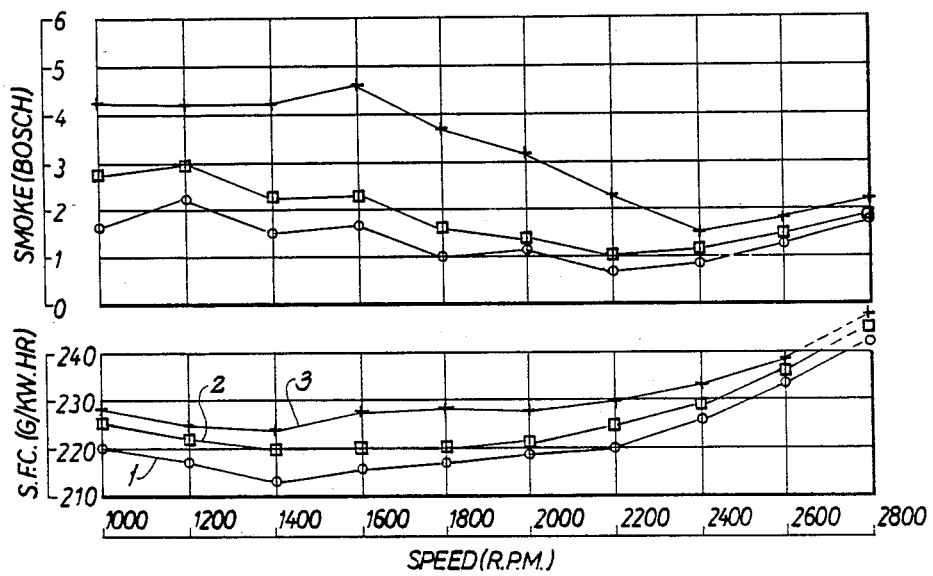
Figure 12:
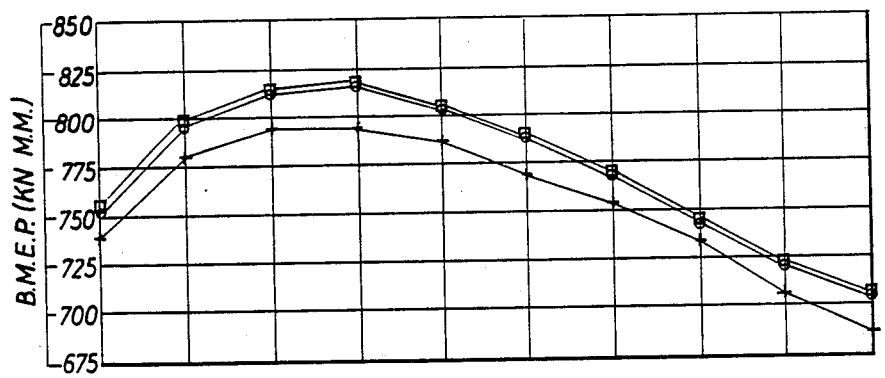
FIG. 12 shows s.f.c. and smoke emission test results similar to those of FIG. 10 but at an injection timing of .16 B.T.D.C. and, FIG. 13 shows a plan view similar to that of FIG. 1 but with the recesses aligned on different axes.
Figure 12:
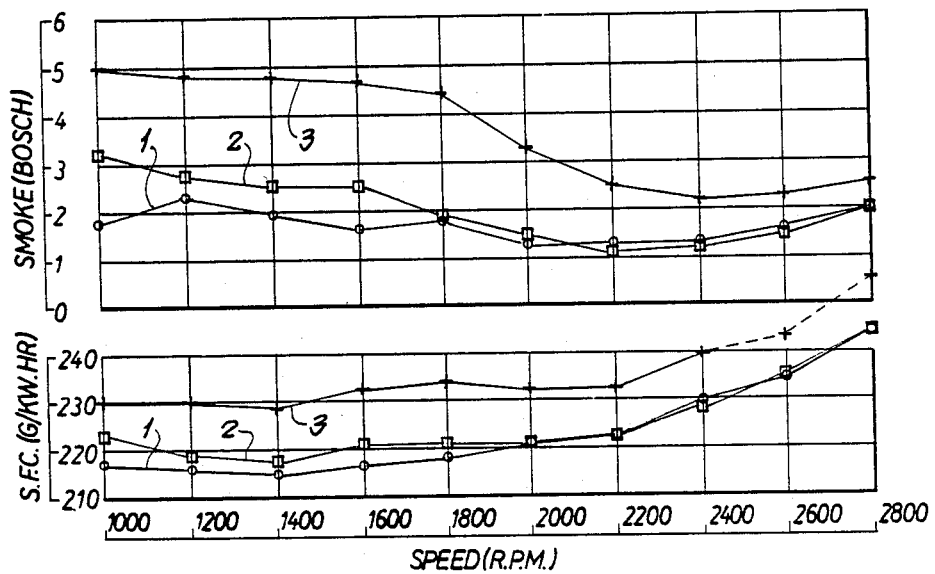

The tests that were conducted in relation to the bowl of FIGS. 1 and 2 to measure specific fuel consumption and smoke emission at 18 degrees B.T.D.C. and 16 degrees B.T.D.C., were repeated using the second and third set of pistons and the results of all three pistons are shown in FIG. 11 for the 18 degrees B.T.D.C. timing, and in FIG. 12 for the 16 degrees B.T.D.C. timing. The plotted results for the first (FIGS. 1 and 2), second and third (FIGS. 9 and 10) pistons are marked 1, 2 and 3, respectively, in FIGS. 11 and 12.

The results demonstrate that the first set of pistons give the best overall specific fuel consumption and smoke emission performance. This is especially clear at the injection timing of 18 degrees B.T.D.C. and is true over the whole engine speed range. At the more retarded injection timing of 16 degrees B.T.D.C., the specific fuel consumption and smoke emission performance of the first set of pistons is best over the lower part of the engine speed range (i.e., below 2000 revolutions per minute), but is slightly worse than that of the second set of pistons over the upper part of the engine speed range. The third set of pistons with the most prominent recesses, shown in FIGS. 9 and 10, gives the worst specific fuel consumption and smoke emission performance.

The slightly better high speed smoke emission performance of the second set of pistons is probably the result of the greater degree of turbulence and mixing caused by the more prominent recesses 7 at higher engine speeds, whereas these recesses may tend to be too destructive of swirl at low and medium engine speeds and cause a deterioration in both specific fuel consumption and smoke emission performance as compared with the first set of pistons having shallower recesses 7. A design choice is therefor involved in deciding on an optimum bowl design, in particular in deciding on the prominence of the recesses 7. The above test results, indicate that shallower recesses give better overall performance, but clearly the recesses will become ineffective if they are too shallow. A ratio $(R1+R3-R2)/R2$ of around 0.19 seems best overall, the acceptable range lying between 0.10 and 0.20.

Figure 13:
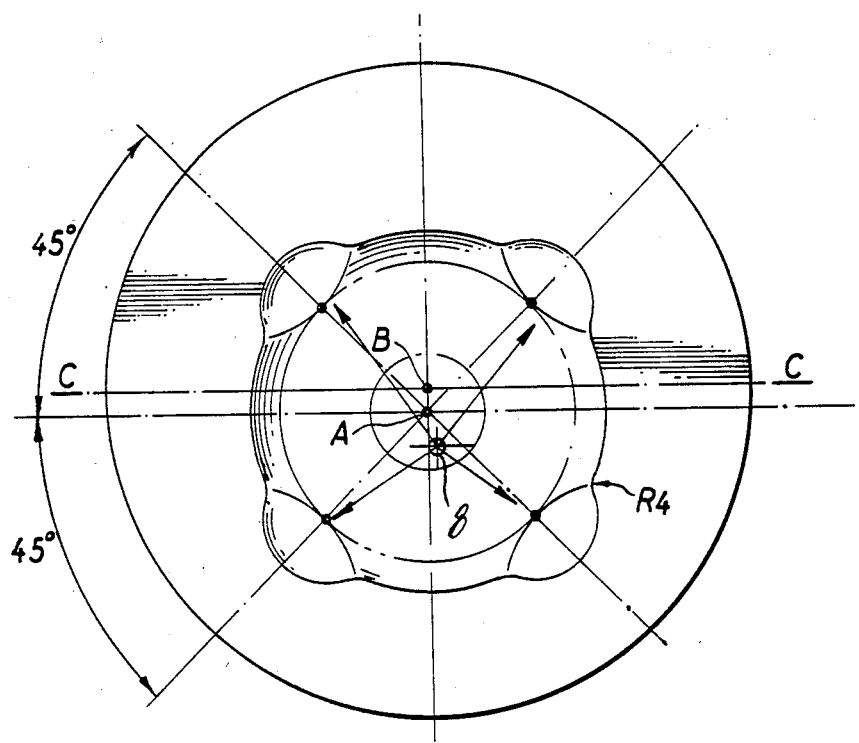

The point at which the fuel jets impinge on the recesses 7 can be varied. As shown in FIG. 1, the fuel jets are directed towards the upstream end of the recesses relative to the direction of swirl. However, comparative specific fuel consumption and smoke emission tests have shown that similar good results are obtained with the recesses 7 of FIG. 1 aligned along 45 degrees bisectors as shown in FIG. 13. In this case, the fuel jets impinge substantially on the central region of each recess. A piston of this design has the advantage that its operation is independent of the direction of swirl in the bowl and thus all the pistons of a multi-cylinder, in-line engine can have the same orientation even though the swirl in different cylinders may be in opposing directions.

As shown in FIG. 13, the junctions between the arcuate recesses 7 and the bowl side wall have been blended, preferably on a radius R4 between 10 and 20 m.m. This blend radius can be used with benefit on all the aforesaid bowls.

I claim:

1. An internal combustion engine piston having a combustion bowl recessed in the crown of the piston and a plurality of recesses formed in the side wall of the bowl so as to extend substantially the full depth of the bowl and which are arcuate in cross-section and spaced apart by arcuate intermediate portions of the side wall, characterised in that the ratio of the maximum distance by which each recess (7) extends radially into the side wall (6) compared with the radius of the side wall (6), lies within the range of 0.10 to 0.20.

2. A piston as claimed in claim 1 in which each of said recesses has an arcuate wall that lies on the arc of a circle in the plane normal to the axis of the bowl.

3. A piston as claimed in claim 2 in which the centres of said arcs lie on a circle.

4. A piston as claimed in claim 3 in which the centres of said arcs lie on a circle within the side wall of the bowl.

5. A piston as claimed in claim 1 in which the side wall of the bowl is generally cylindrical and each of the recesses extends parallel to the axis of the bowl.

6. An internal combustion engine comprising a piston as claimed in claim 1, swirl means to cause the inlet air to swirl about the axis of the bowl, and fuel injection means that serves to direct a plurality of fuel jets radially of the bowl each towards the central region of a corresponding recess.

* * * * *